United States Patent [19]
Stevens et al.

[11] Patent Number: 5,724,606
[45] Date of Patent: Mar. 3, 1998

[54] EXTENDED PERIPHERAL BUS WITH BIDIRECTIONAL TRANSMISSION

[75] Inventors: Phillip M. Stevens, Attleboro; George Stephan, Taunton; Matthew H. Trask, Bourne; Barry M. Kasindorf, Franklin, all of Mass.

[73] Assignee: International Business Machines Corporation, Armonk, N.Y.

[21] Appl. No.: 854,590

[22] Filed: May 12, 1997

Related U.S. Application Data

[63] Continuation of Ser. No. 340,308, Nov. 14, 1994, abandoned.

[51] Int. Cl.[6] .......................... G06F 13/00; G06F 13/38
[52] U.S. Cl. .......................... 395/821; 395/281
[58] Field of Search .................. 395/821, 823, 395/829, 822, 883, 281, 280, 306, 250

[56] References Cited

U.S. PATENT DOCUMENTS

| | | | |
|---|---|---|---|
| 3,833,930 | 9/1974 | Macker | 395/821 |
| 4,573,120 | 2/1986 | Ichimiya et al. | 395/821 |
| 4,617,566 | 10/1986 | Diamond | 340/870.11 |
| 4,631,671 | 12/1986 | Kawashita et al. | 395/842 |
| 4,641,238 | 2/1987 | Kneib | 395/290 |
| 4,773,005 | 9/1988 | Sullivan | 395/829 |
| 4,870,564 | 9/1989 | Ketelhut et al. | 395/700 |
| 5,003,508 | 3/1991 | Hall | 395/286 |
| 5,090,013 | 2/1992 | Fadem | 370/85.8 |
| 5,107,507 | 4/1992 | Bland et al. | 371/49.1 |
| 5,170,252 | 12/1992 | Gear et al. | 348/659 |
| 5,204,669 | 4/1993 | Dorfe et al. | 340/825.52 |
| 5,317,693 | 5/1994 | Cuenod et al. | 395/829 |
| 5,404,460 | 4/1995 | Thomsen et al. | 395/829 |
| 5,452,419 | 9/1995 | Di Giulio et al. | 395/200.01 |
| 5,483,230 | 1/1996 | Mueller | 340/825.06 |

*Primary Examiner*—Gopal C. Ray
*Attorney, Agent, or Firm*—Bernard D. Bogdon

[57] ABSTRACT

A keyboard bus is provided in a PC for connecting a peripheral such as a keyboard to a central unit, serially through external modules coupled to the bus enabling communication with the central unit by any of the external modules or the keyboard independently of other. The external modules are coupled serially to each other with a peripheral device, such as a keyboard, disposed most remotely from the central unit. The modules are serially connected in an open chain to the central processor for communication bidirectionally by an address signal to the intended respective module and an attention acknowledgment signal back to the central processor indicating a readiness for data reception.

5 Claims, 6 Drawing Sheets

| Pin | 5 Pin DIN | 6 Pin Mini DIN |
|---|---|---|
| 1 | Clock Signal | Serial Data |
| 2 | Serial Data | NOT USED |
| 3 | NOT USED | Ground |
| 4 | Ground | 5 VDC |
| 5 | 5 VDC | Clock Signal |
| 6 | NOT THERE | NOT USED |

Table 2.1

RCPT ACK BYTE 0       RCPT ACK BYTE 1

FIG. 7

EXTENDED PERIPHERAL BUS WITH BIDIRECTIONAL TRANSMISSION

The application is a continuation of application Ser. No. 08/340,308, filed Nov. 14, 1994, abandoned.

BACKGROUND OF THE INVENTION

1. Field of the Invention

This invention relates generally to data communications in a computer-based system, and more particularly, to a computer keyboard bus that allows numerous modules to communicate with a central processor of a computer.

2. Description of Related Art

Figure 1:
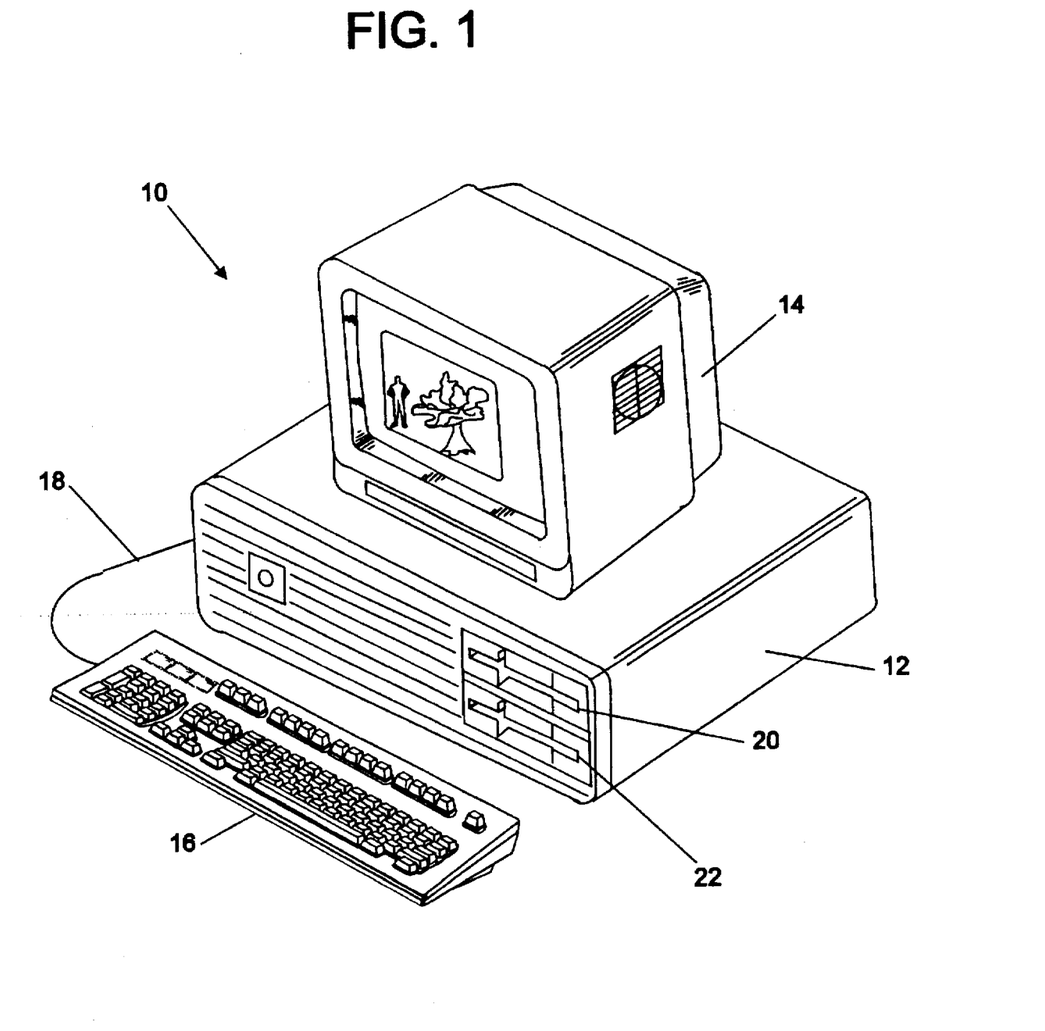
FIG. 1 is a perspective view of a personal computer system within which the present invention has application.

With reference to FIG. 1, a personal computer, or PC, designated 10 is of the environment to which the invention has particular utility. The computer 10 which preferably, but not necessarily, is of a type utilizing an IBM Personal Computer 2 or similar system, includes a console housing 12 within which circuit boards containing the necessary circuitry including microprocessor and BIOS chips, controllers, random access memory and other hardware are arranged. The computer will also include a video display 14, and a keyboard 16 connected into the housing 12 through cable 18. Mass storage media include a hard drive within the housing and not accessible to the user, and user accessible floppy disk and CD-ROM drives 20 and 22.

Figure 2:
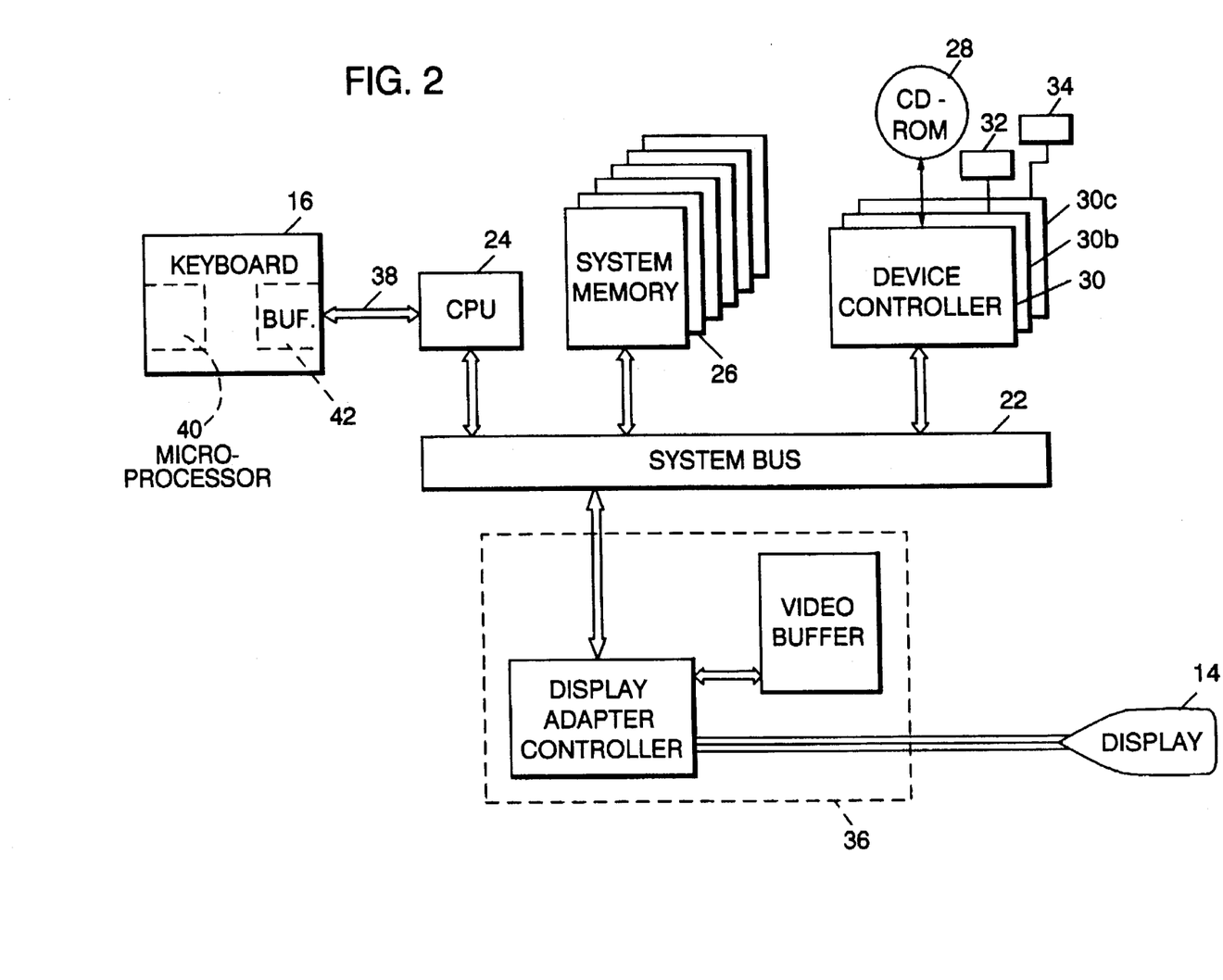
FIG. 2 is a block diagram of a personal computer based data processing system within which the invention may reside.

The architecture of computer system 10, depicted in FIG. 2, is based on a system bus 22 on which data is passed between components of the computer, including a central processing unit (CPU) 24 which preferably is based on one of the "486" family or more powerful types of processors, manufactured by Intel Corporation or others, executes programs stored in main or system memory 26 and manipulates data stored in the same memory. Data, including multimedia, may be stored in CD-ROM 28 and accessed by CPU 24 per ISO 9660 specifications through a device controller 30 connected to system bus 22. Other data are stored in floppy and hard disk drives 32 and 34 for access by the CPU 24 through corresponding controllers 30b and 30c. Display 14 is connected to the system bus 22 through a video controller 36.

The keyboard 16 is coupled to the CPU 24 through the computer keyboard bus 18, as illustrated in FIG. 1, and bus 38, as illustrated in FIG. 2. When a key on the keyboard 16 is pressed, a keyboard microprocessor 40 built into the keyboard generates a scan code indicating which key was pressed. The scan code is then loaded into a keyboard memory buffer 42 and relayed to the CPU.

Each press of a key generates two different scan codes— one when the key is pushed down and, another when it pops back up. Each key generates a unique scan code received by the computer's BIOS. Then, the keyboard microprocessor 40 sends an interrupt signal over the keyboard bus 18 to tell the CPU that a scan code can be read.

The scan code system simplifies the connection scheme used by PC keyboards. Scan codes are sent from the keyboard to the CPU serially so that only one wire conductor is needed to convey the keyboard data information. A second conductor is required to serve as a return path for the data signal, and as a ground. It serves as a common return for all other circuits in the keyboard bus. To synchronize the logic in the keyboard with that in the CPU, a separate wire is used for a keyboard clock signal. A fourth wire is used to supply the keyboard with the five volt direct current power that it needs to operate. These four conductors are all that is necessary to link the keyboard to the computer.

Figure 3:
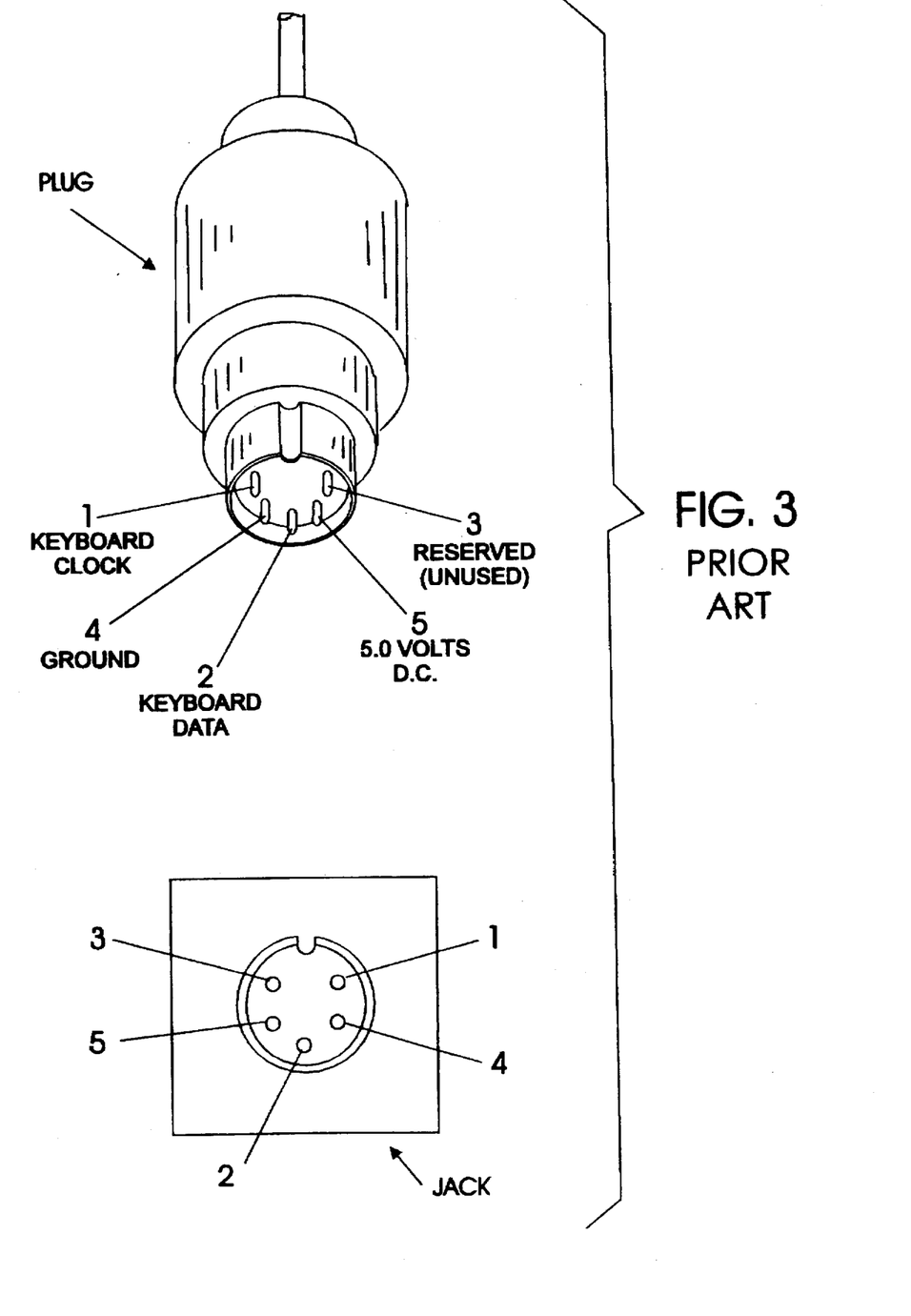
FIG. 3 shows a 5-pin DIN connector.

Most PCs that follow the IBM PC wiring system use a standard five-pin DIN connector system having the pin-out shown in FIG. 3. Pin 1 of the connector is assigned the keyboard clock signal; and pin 2—the keyboard data signal; pin 4—the ground; pin 5—the five-volt electrical supply. One of the connections—pin 3—is assigned to carry a signal to reset the keyboard, but it is normally not used and need not be connected in normal keyboard cabling.

IBM adopted another wiring scheme for its PS/2 series of machines. The PS/2 wiring system is based on a six-pin miniature DIN connector (not illustrated except as to FIG. 4). Again, only four pins are significant to keyboard use: pin 1 is assigned keyboard data, pin 3—the ground, pin 4—five-volt supply, and pin 5—the keyboard clock. Pins 2 and 6 are reserved, and the shield is attached as a chassis ground.

However, as discussed above, heretofore the keyboard bus is provided only to input data from the keyboard to the CPU. To make a personal computer system more flexible, it is desirable to provide an extended keyboard bus that allows numerous peripheral modules to communicate with the central processor, in addition to the keyboard.

Also, it is desirable to provide a communication protocol that supports communications not only from the peripheral modules to the central processor but also from the central processor to the modules.

Further it is desirable to provide a communication protocol that allows the modules of any hardware structure to communicate with the central processor.

SUMMARY OF THE INVENTION

Accordingly, one advantage of the invention is in providing an improved extended keyboard bus that allows numerous peripheral modules to communicate with the central processor.

Another advantage of the invention is in providing a communication protocol to support communications not only from peripheral modules to a central processor but also from the central processor to the modules.

A further advantage of the invention is in providing a communication protocol that allows the modules of any hardware structure to communicate with the central processor through the improved extended keyboard bus.

The above and other advantages of the invention are achieved, at least, in part, by providing a method of and system for data communication between a central processor and a plurality of modules coupled to a bus connecting a peripheral device to the central processor. The modules are connected in series between the central processor and the peripheral device to receive and transmit information from and to the central processor.

The following steps are carried out:
sending by the central processor through the bus an address signal indicative of address data of a module coupled to the bus, in response to the address signal, terminating by the addressed module, data transmission through the bus to the modules coupled between the addressed module and said peripheral device, and thereafter, sending an attention acknowledgement signal to the central processor to indicate readiness for data reception, in response to the attention acknowledgement signal, sending by the central processor to the addressed module through the bus a count signal indicative of the number of bytes to be sent after the occurrence to the count signal, thereafter, sending by the central processor to said addressed module through the bus a command byte and a plurality of data bytes, and sending by the addressed module to the central processor through the bus a receipt acknowledgement signal in response to the receipt of the data bytes.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DESCRIPTION OF THE ILLUSTRATIVE EMBODIMENT

Although the invention has general applicability in the field of data manipulation, the best mode for practicing the invention is based in part on the realization that a personal computer (PC) is provided with an extended keyboard bus to support data communications between a central processor and numerous peripheral modules attached to the bus.

Figure 5:
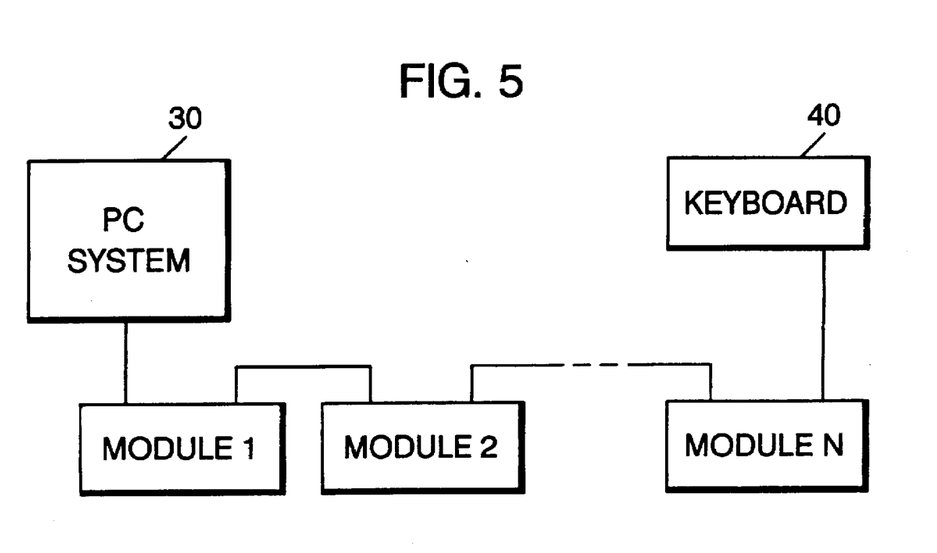
FIG. 5 shows the modules connection.

An extended keyboard bus (XK Bus), as illustrated, for example, in FIG. 5, is a general purpose bus which hangs off the keyboard connector on a personal computer. Multiple devices may be connected to the XK Bus including a system's keyboard which is typically at the end of the bus. The XK Bus make no assumption as to what the hardware make up of the devices on the bus may be. It simply provides for communication protocol between the computer system and any device on the bus, regardless of its hardware. Devices on the XK Bus can be other than keyboard and mouse systems.

The XK Bus consists of four wires. This corresponds to the keyboard connection to a personal computer. It contains:

1. Clock Signal
2. Data line
3. Ground
4. Power (5 VDC)

Figure 4:
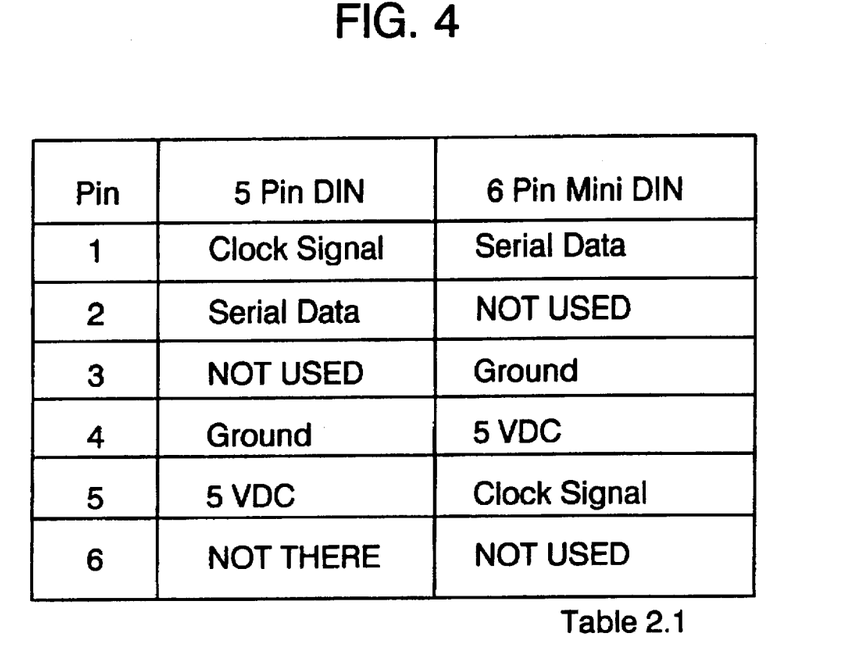
FIG. 4 is an extended keyboard bus specification.

As shown in FIG. 4, the above wires follow the discussed above keyboard connection using a 5 pin DIN or a 6 pin miniature DIN connectors. The signal and clock lines are driven from an open collector driver with a 10K ohm pull up resistor.

Data line on the XK bus is bi-directional and data serial. Each module connected to the bus must have two connectors to the bus. One used for data upstream from it while the other is used for data downstream.

A keyboard does not have to be coupled to this bus, however if the keyboard is connected, it is placed at the end of the bus, as a last device on it. The only exception is if the keyboard is capable of handling up/down stream data communication.

Referring to FIG. 5, numerous external modules 1-N may be connected in series in an open chain to an the XK Bus between a PC system 30 and a keyboard 40. The modules connected to the bus are able to handle serial data seen on the data line and are able to interpret and process it as specified by the communication specification mentioned later. Each module has two separate physical connection points to the bus, in order to separate the up stream data from the down stream data.

Serial data received from up stream of the data line are sent out down stream on the data line as disclosed later.

Up to 16 modules may be connected to the bus, in addition to the PC system 30 and PC keyboard 40 in an open chain as illustrated in FIG. 5.

The module on the bus connected as the last module before the keyboard, performs the additional task of buffering any data that may be sent by the keyboard while another module upstream is busy communicating on the bus, even when the module tying up the bus is the last module on the bus.

All modules are addressed individually starting with address at A0h through AFh. Each module on the bus is assigned a unique address in the above-mentioned range. This address is setup and configured on reset when the system is started. A module is capable of memorizing its address every time after it is reset.

The addresses assigned for the keyboard responses are as follows: FAh—for the keyboard acknowledgement (Kbd ACK) signal, FEh—for the Resend command, and FFh—for the Overrun signal.

Figure 6:
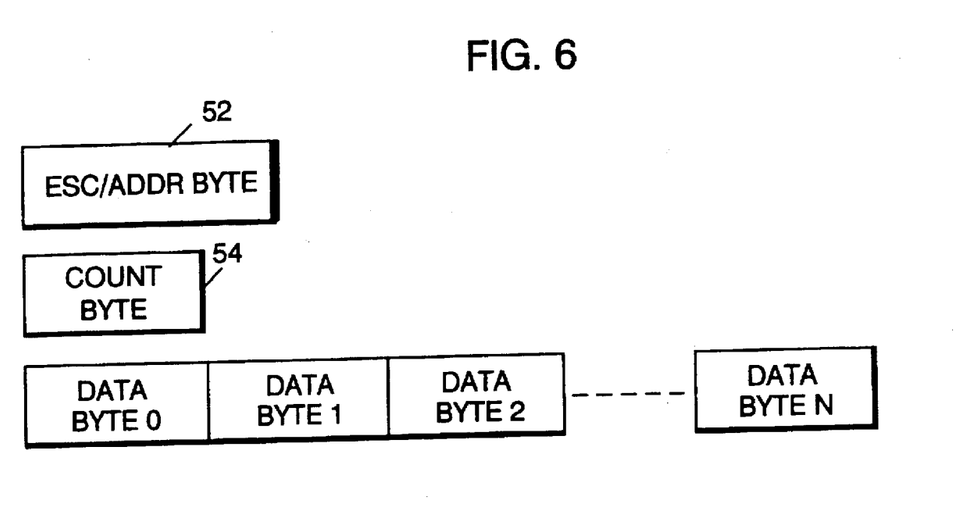
FIG. 6 illustrates a format of a data packet sent by the central processor to the modules.

Referring to FIG. 6, a data packet may be made up of 16 bytes. It is started with a Escape/Address Byte 52 which is used to indicate to all modules on the bus that a packet is about to come through. This byte is followed by a Count Byte 54, which indicates to the intended module and the ones up stream from it, the number of data bytes 0-N in the data packet to follow.

Not more than 16 bytes may be sent in one data packet at a time. In this embodiment it is to minimize the amount of time clock is suspended to the keyboard. The first data byte received by the addressed module becomes a command to it or a continuation of a previous command already in progress. The first data byte is an operational code OpCode followed by whatever else the module requires for its communication protocol. Each module can define its communication interface individually.

The bus communication protocol is devised in a way so that it minimally affects the system, the keyboard and users who happen to be actively running applications. It is important that the communication packet be as short as it can be and get handled as quickly as can be.

The communication between the system and the bus proceeds in the following manner:

System sends Esc/Addr Byte to module on bus

System waits for attention acknowledgement (ATTN ACK) from intended module

Module disables downstream data

Module sends an attention acknowledgement to the system

System begins to send data to module

Modules upstream ignore data

Intended module receives data from system

System waits for data receipt acknowledgement (RCPT ACK)

Modules upstream wait for RCPT ACK also

Intended module sends RCPT ACK to system

Intended module enables downstream data, and

Bus cycle is terminated

Figure 7:
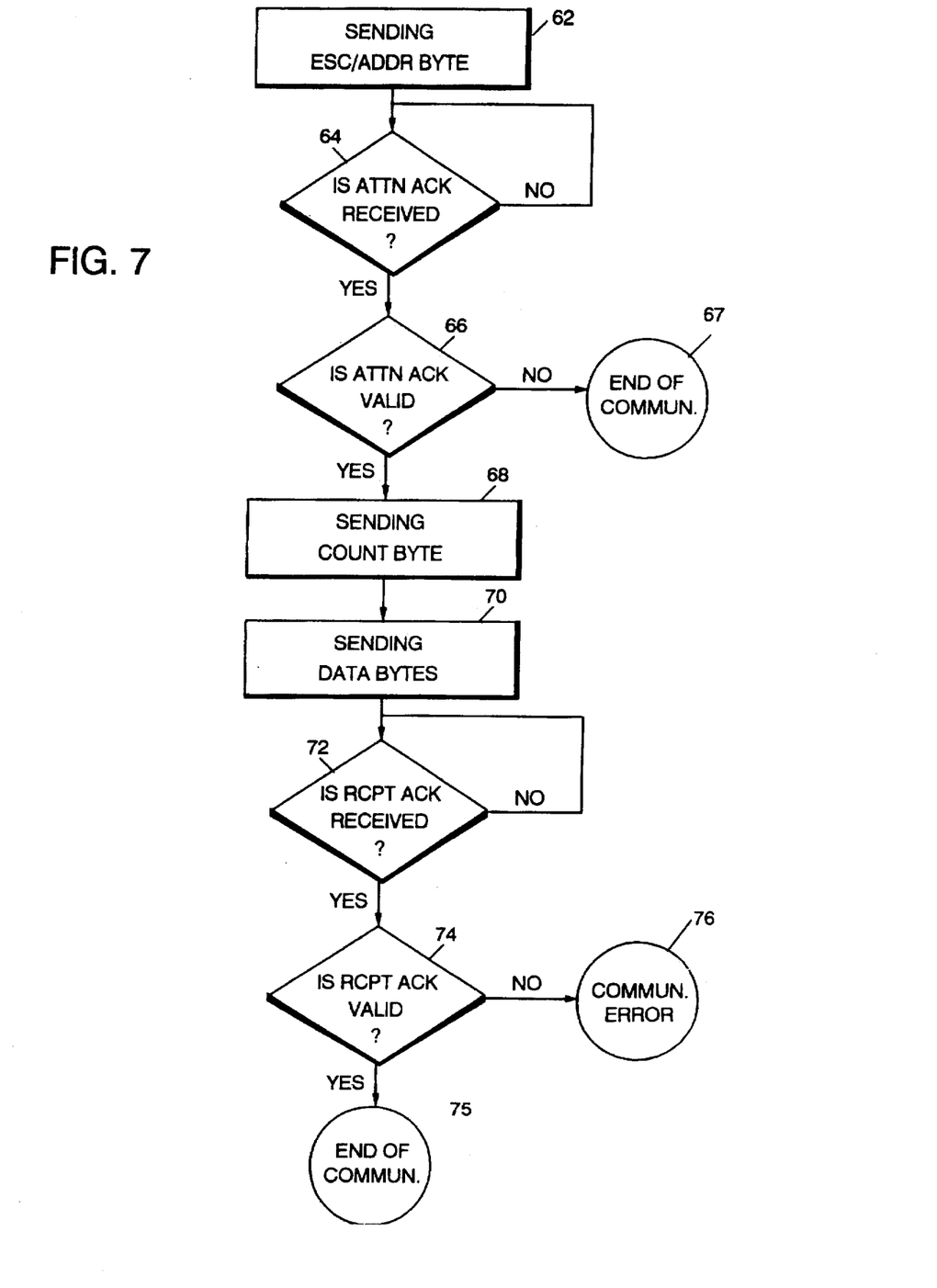
FIG. 7 illustrates a protocol that supports data exchange between the central processor and modules.

Referring to FIG. 7, a communication cycle is initiated by the PC System. This is done by sending an Esc/Addr byte on the bus to a specific module (block 62). As the byte is seen by each module in the stream on the bus, it is evaluated and if it is not meant for it, it is send out downstream to the next module. This byte if not received by one of the modules on the bus, will eventually be received by the keyboard.

Once the Esc/Addr byte is sent out on the bus, the system waits for an ATTN ACK to Esc/Addr byte to be received from intended module (block 64). Alternatively, a resend command from the keyboard may be received. A resend command from the keyboard will be considered as a non-acknowledgement signal (NAK) from the bus. Accordingly, the system checks validity of the received ATTN ACK signal (block 66), and if the resend command from the keyboard is received, the communication cycle is terminated (block 62). If an ATTN ACK is received, the system continues with the communication cycle.

Each module on the bus along the stream receives the Esc/Addr byte in turn. It reviews the byte and determines if it is meant for it or not. If it is not intended for its use, the module passes the byte downstream to the next module. If it is determined that it the intended module, then it immediately stops sending anything downstream until the communication cycle is completed.

First action to be taken by the module on the bus after stopping data from going downstream is to send ATTN ACK to the system to acknowledge the receipt of a Esc/Addr byte. This ATTN ACK may be returned immediately before processing anything else. All modules upstream from it may simply allow the byte to travel back to the system without any further processing.

Once the system receives the ATTN ACK from the intended module, the system sends the count byte that indicates the number of the data bytes in the data packet (block 68). Thereafter, it begins to send the data bytes from the buffer as specified by the count (block 70). All bytes will be transmitted downstream while all modules upstream simply pass the bytes along without any processing. The intended module receives all the data byte, but does not do any processing of the data until the data reception is acknowledged. The intended module reestablishes the data line to the downstream modules just as before the communication cycle had started. The system meanwhile waits for a data receipt acknowledgement RCPT ACK to come back from the intended module after transmitting the last data byte (block 72).

Once the last byte expected is received by the intended module, it sends a RCPT ACK to the system. As disclosed in more detail later, the RCPT ACK indicates the address of the intended module and the number of the last data byte received. All modules upstream do not process the RCPT ACK, they simply pass it back to the system. The system checks whether the RCPT ACK is valid (block 74) and terminates the communication cycle (block 75). If the RCPT ACK is not valid the host processor is informed about a communication error (block 76).

As discussed above, the Escape/Address byte is used as a XK Bus communication cycle initiator. Until it is seen on the bus, all bytes are simply passed along the stream to the next module in line data to or from the keyboard. This byte serves as an attention grabber to all modules including the keyboard. This byte contains Ah in the high nibble while the module addresses in the low nibble of the byte. So all addresses are Axh since no keyboard command exist in this range. For example, module at address 5 on the bus corresponds to the byte content A5h.

In the absence of ATTN ACK, the communication cycle is stopped and assumed to be contemplated with an error return. The ATTN ACK byte contains the Escape/Address byte with its nibbles swapped. It means that the intended module's address is the high nibble and Ah goes into the low nibble position. So if addressing module A5h, the ATTN ACK byte will contain 5 Ah.

Figure 8:
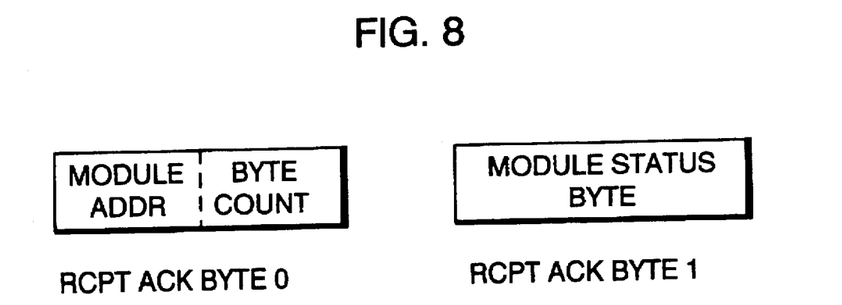
FIG. 8 shows a format of a data receipt acknowledgement signal that completes the data exchange.

The RCPT ACK signal is different from the attention byte ACK. It is used at the end of a communication cycle by the module to indicate receipt of data from the system once the communication cycle is initiated. The RCPT ACK is made up of two byte and must be ignored by all modules upstream. As shown in FIG. 8, the first byte contains the intended module's address in the high nibble position and the received data byte count in the low nibble position. The second byte contains any status data which is unique to the module involved in the communication cycle.

Interrupt 16h is the keyboard interrupt and as such it will be used for the purpose of communicating on the XK Bus. Function 80h is used for XK Bus communication. There exists two subfunction for XK Bus communication, one used to send a command to a device while the other is used for receiving or requesting data from devices on the bus.

The subfunction used in the communication is expressed in the AL register while the function for Int16h is expressed in the AH register. All other registers (BX, CX, ES, DX, CF) are used as follows:

SEND DEVICE COMMAND—(00h)

The send device command uses subfunction number 00h.

To call do the following:

AH=80h

AL=00H

BX=Module ID

CX=Data stream byte count

ES:DX=Seg:Off to pointer of data stream being sent to the module

On return:

If successful -

CF=0

AH=Module ID as received by the ACK process

AL=Data byte count as received by the ACK process

DX=Device Status byte as received by the ACK process

BX, CX and ES are left unmodified.

If unsuccessful -

CF=1

AX=Error Code

BX, CX, DX and ES are left unmodified.

RECEIVE DEVICE DATA COMMAND—(01h)

The receive data from device command uses subfunction 01b.

To call do the following:

AH=80h

AL=01h

BX=Module ID

ES:DX=Seg:Off to pointer of data stream where data will be deposited.

On return:
　If successful -
　　CF=0
　　AH=Module ID as received by the ACK process
　　AL=Data byte count as received by the ACK process
　　CX=Device Status byte as received by the ACK process
　　BX, DX and ES are left unmodified
　If unsuccessful
　　CF=1
　　AX=Error code
　　BX, DX and ES are left unmodified.

In this disclosure, there are shown and described only the preferred embodiment of the invention, but it is to be understood that the invention is capable of changes and modifications within the scope of the inventive concept as expressed herein.

What is claimed is:

1. A data communications system, comprising:

a peripheral bus for communicating information bidirectionally;

a central processor coupled to the peripheral bus;

an input device coupled to the central processor to supply it with input data through the peripheral bus;

a plurality of external modules coupled in series in an open chain to the peripheral bus between the central processor and the input device to receive and transmit information bidirectionally on the peripheral bus from and to the central processor;

each of the modules being identified by a unique address to receive and process only that information associated with the respective address and to pass, without processing, any information that has an address different than the address of the respective module along the open chain of external modules; and each of the modules includes a buffer register to accumulate data intended for another module, when said another module is not able to receive the data intended for said another module.

2. The data communication system of claim 1, further including logic for buffering in the respective buffer register any information from the input device or any information from any one of the external modules, at any time that any external module, between the central processor and the input device or the any one of the external modules providing information, is transmitting information on the peripheral bus.

3. The data communication system, as defined in claim 1, wherein each of the plurality of external modules has two separate physical connection points to the bus for separating the bidirectional data communication on the bus both up stream and down stream.

4. Method of data communication between a central processor and a plurality of modules serially coupled in an open chain to a bus connecting a peripheral device to the central processor, comprising the steps of:

sending by the central processor through the bus an address signal indicative of address data of a module from the plurality of modules serially coupled in an open chain to the bus, terminating by the addressed module, in response to the address signal, data transmission through the bus to any of the plurality of modules serially coupled between the addressed module and the peripheral device, and thereafter, sending an attention acknowledgment signal to the central processor through the bus to indicate readiness for data reception to the addressed module, sending by the central processor to the addressed module through the bus, in response to the attention acknowledgment signal, a count signal indicative of the number of bytes to be sent after the count signal, sending by the central processor to the addressed module through the bus a command byte, and a plurality of data bytes, accumulating the data bytes in one of the plurality of modules interposed between the central processor and the addressed module, when the addressed module or any other of the plurality of modules interposed between the module accumulating the data bytes and the addressed module is in a stage of transmitting on the bus, and sending by the addressed module to the central processor through the bus, a receipt acknowledgment signal in response to the received data bytes.

5. The method of data communication between the central processor and the plurality of modules serially coupled in the open chain to the bus connecting the peripheral device to the central processor, as defined in claim 4, further comprising the step of separating the bidirectional data communication on the bus for receipt by each module, respectively, on separate up stream and down stream connection points.

* * * * *